United States Patent [19]

Antkiw

[11] 4,055,763
[45] Oct. 25, 1977

[54] NEUTRON CHARACTERISTIC AND SPECTROSCOPY LOGGING METHODS AND APPARATUS

[75] Inventor: Stephen Antkiw, Ridgefield, Conn.

[73] Assignee: Schlumberger Technology Corporation, New York, N.Y.

[21] Appl. No.: 686,781

[22] Filed: May 17, 1976

Related U.S. Application Data

[63] Continuation of Ser. No. 563,359, March 31, 1975, abandoned.

[51] Int. Cl.$^2$ .............................................. G01V 5/00
[52] U.S. Cl. .................................. 250/270; 250/252; 250/262
[58] Field of Search ................. 250/252, 269, 270, 262

[56] References Cited

U.S. PATENT DOCUMENTS 3,928,763  12/1975  Scott ...................................... 250/270

Primary Examiner—Harold A. Dixon
Attorney, Agent, or Firm—Brumbaugh, Graves, Donohue & Raymond

[57] ABSTRACT

In the illustrative embodiments of the invention disclosed, earth formations surrounding a well bore are irradiated with pulses of fast neutrons, and gamma rays resulting from the ensuing thermal neutron capture interactions with nuclei of the formations are detected, from which measurements of the thermal neutron decay times characterizing the respective formations are derived and the gamma ray energy spectra of the respective formations are analyzed. Gating of the gamma ray detection periods is automatically controlled, both for the decay time and the spectroscopy functions, in accordance with the measured values of the decay times. The duration and repetition rate of the neutron pulses are also controlled as a function of the measured decay times to provide an overall optimized decay time-spectroscopy operating cycle. Spectroscopy outputs representative of formation lithology, salinity, porosity and shaliness are developed to supplement and improve decay time log interpretation.

47 Claims, 4 Drawing Figures

NEUTRON CHARACTERISTIC AND SPECTROSCOPY LOGGING METHODS AND APPARATUS

This is a continuation, of application Ser. No. 563,359, filed March 31, 1975, now abandoned.

BACKGROUND OF THE INVENTION

1. Field of the Invention

The present invention relates broadly to nuclear well logging apparatus and methods, and pertains in particular to improved apparatus and methods for providing, through the combined logging of neutron characteristic data and gamma ray spectroscopy data, additional and more accurate information concerning the location and recoverability of hydrocarbons in subsurface earth formations.

2. The Prior Art

Generally in logging earth foundations to identify oil-bearing or gas-bearing zones, it is important not only to detect the presence of hydrocarbons but also to determine their relative abundance (saturation) and ease of recovery. In this connection, it is desirable that information be obtained regarding such formation parameters as lithology, shaliness, porosity and salinity, as information of this nature is useful in making quantitative evaluations of hydrocarbon and water saturation levels as well as bearing importantly on the productivity of any given formation.

One form of nuclear well logging intended to afford the foregoing information is described in U.S. Pat. No. 3,521,064, granted July 21, 1970 to James H. Moran et al. and assigned to the assignee of the present application. In the Moran et al. system, a detected gamma ray energy spectrum, illustratively the thermal neutron capture gamma ray spectrum, of an earth formation of unknown composition is analyzed by matching it with a composite spectrum made up of weighted spectra of known constituent materials. By comparing the magnitude of the detected gamma ray energy spectrum at a large number of separate points or energy levels with the magnitude of the composite spectrum, to obtain the best possible match, an accurate analysis of the formation composition can be obtained. Through appropriate selection of the constituent spectra, spectroscopy outputs representative of formation properties of interest, such as porosity, shaliness, salinity, lithology, and the like, may also be derived. Prior systems for implementing the Moran et al. concepts, however, have been subject to perturbational effects and statistical uncertainties which have detracted from their usefulness in some circumstances.

Another form of through-casing nuclear well logging involves the determination of one or more selected neutron characteristics of a formation, including, for example, the thermal neutron lifetime or decay time ($\tau$), the macroscopic absorption (capture) cross section ($\Sigma$), and the neutron slowing down time. Systems useful in deriving measurements of these characteristics are described in U.S. Pat. No. 3,566,116 to William B. Nelligan, dated Feb. 23, 1971, U.S. Pat. No. 3,662,179 to Arthur H. Frentrop et al., dated May 9, 1972, and in U.S. application Ser. No. 356,151, filed May 1, 1973 by William B. Nelligan, all of which are assigned to the assignee of this application. Much valuable information, useful especially in distinguishing between salt water and oil and detecting changes in water saturation, is provided by these systems. Interpretation of neutron characteristic logs, e.g., the $\tau$ and $\Sigma$ logs, is however improved by reliable and correlatable data of formation lithology, porosity and shaliness. This is particularly true in low salinity formations, where the $\tau$ and $\Sigma$ logs are less dependable, and where different formations evidence similar $\tau$ and $\Sigma$ values.

Although J. Tittman, in U.S. Pat. No. 3,413,471, dated Nov. 26, 1968 and commonly owned with the instant application, recognizes in general that useful correlations exist between thermal neutron lifetime logs and certain gamma ray spectroscopic logging data, there has heretofore been no integration of neutron characteristic logging and gamma ray spectroscopy logging functions in a manner to provide in a single system sufficient information respecting the various formation parameters of interest to enable full and accurate evaluation of hydrocarbon zones.

SUMMARY OF THE INVENTION

It is therefore an object of the invention to provide improved nuclear logging methods and apparatus, particularly for use in cased holes, which afford additional knowledge as to the location and productivity of hydrocarbon-bearing formations.

It is another object of the invention to provide this further knowledge by means of a combined logging system which concurrently provides data of selected neutron characteristics and complete data of the composition of the earth formations traversed by a well bore.

Still another object of the invention is to provide a logging system which combines, in a manner to afford additional and more accurate information, both a capability for spectroscopically analyzing gamma ray energy spectra of earth formations and a capability for measuring neutron absorption characteristics of the formations.

The foregoing and other objects are attained, in accordance with the invention, by deriving a measurement of a neutron characteristic of an earth formation to be investigated from representations of neutron interactions with nuclei of the formation following irradiation of the formation with a pulse of fast neutrons, thereafter, following a subsequent neutron pulse, employing the measured value of the neutron characteristic to select a portion of the time distribution of gamma rays resulting from neutron interactions between neutrons emitted during the subsequent neutron pulse and nuclei of the formation; and analyzing at least a portion of the energy spectrum of the selected gamma rays. Illustratively, the neutron characteristic measured is a thermal neutron absorption characteristic of the formation, i.e., the thermal neutron decay time ($\tau$) or the macroscopic absorption (capture) cross secton ($\Sigma$), and the gamma ray energy spectrum analyzed is the thermal neutron absorption (capture) gamma ray spectrum. By choosing the portion of the time distribution of gamma rays to be analyzed in accordance with the measured value of a neutron absorption characteristic, selection of the capture gamma ray energy spectrum is properly made for the particular formation under investigation. The selected spectrum is thus accurately representative of the composition of the formation, notwithstanding that the thermal neutron absorption properties of the formation, which largely determine the duration and shape of the capture gamma ray time distribution following a neutron pulse, may differ among the formations traversed by a well bore.

Analysis of gamma ray energy spectra is preferably accomplished by comparing a detected spectrum with a composite energy spectrum made up of weighted spectra of constituents postulated to comprise the formation examined, and outputs are generated of the proportions of the postulated constituents which produce a composite spectrum that most nearly matches the detected gamma ray spectrum. Ratios of the spectroscopy outputs may be derived to afford information regarding such formation parameters as porosity, salinity, lithology and shaliness. These spectroscopy data are logged along with measured values of neutron characteristics of the formation, and correlation of the spectroscopy data and the neutron characteristic data affords additional and more accurate information as to the hydrocarbon content and productivity of the formation.

In a preferred embodiment of the invention, a formation to be investigated is successively irradiated with timespaced pulses of fast neutrons and measurements of the thermal neutron decay time ($\tau$) of the formation are derived from capture gamma rays detected following selected neutron pulses. Suitably, the selected pulses are spaced from one another by one or more, e.g., five, intervening pulses. A spectroscopy detection period follows each neutron pulse, and its time of occurrence relative to the time of occurrence of the associated neutron pulse is controlled as a function of a previously measured value of $\tau$. For example, the spectroscopy detection period may be timed to occur during the interval from $1\tau$ to $3\tau$ after termination of the preceding neutron pulse. The duration and repetition rate of the neutron pulses are also preferably controlled in accordance with the decay time, illustrative pulse parameters being a duration of $1\tau$ for all pulses and a pulse spacing of $4\tau$, except for those pulses next succeeding the selected pulses employed in measuring $\tau$. Each of the selected pulses preferably is followed by at least a $10\tau$ interval, within which a decay time detection period is arranged. This period, too, is controlled in time as a function of $\tau$. Control of the neutron pulses and decay time and spectroscopy detection periods in the manner described maximizes detector counting rates and affords highly efficient use of the neutron source, and at the same time substantially reduces undesirable borehole effects in the spectroscopy and decay time outputs.

BRIEF DESCRIPTION OF THE DRAWINGS

Further objects and advantages of the invention will be apparent from the following detailed description of exemplary embodiments thereof, taken in conjunction with the accompanying drawings, in which.

DESCRIPTION OF EXEMPLARY EMBODIMENTS

As previously mentioned, the present invention is intended in broad terms to afford enhanced information of use in locating and evaluating oil-bearing and gas-bearing zones in earth formations. It has particular application in cased-hole logging, e.g., for workover and producing wells, identifying unproduced oil zones, and the like, but is useful in open holes as well. Representative apparatus for implementing the invention in a manner productive of particularly advantageous results is illustrated schematically in FIG. 1. Specifically, it comprises apparatus for concurrently deriving measurements of $\tau$ and $\Sigma$ of formations of interest, generally as described in the aforementioned Nelligan and Frentrop et al. patents, and analyzing selected portions of the capture gamma ray spectra of the formations, primarily in accordance with the curve-fitting technique of the aforementioned Moran et al. patent. It will be understood, however, that the apparatus disclosed is illustrative only, that it may be applied to the measurement of other neutron characteristics, and that gamma ray energy spectra other than or in addition to capture gamma ray spectra may be analyzed.

Figure 1:
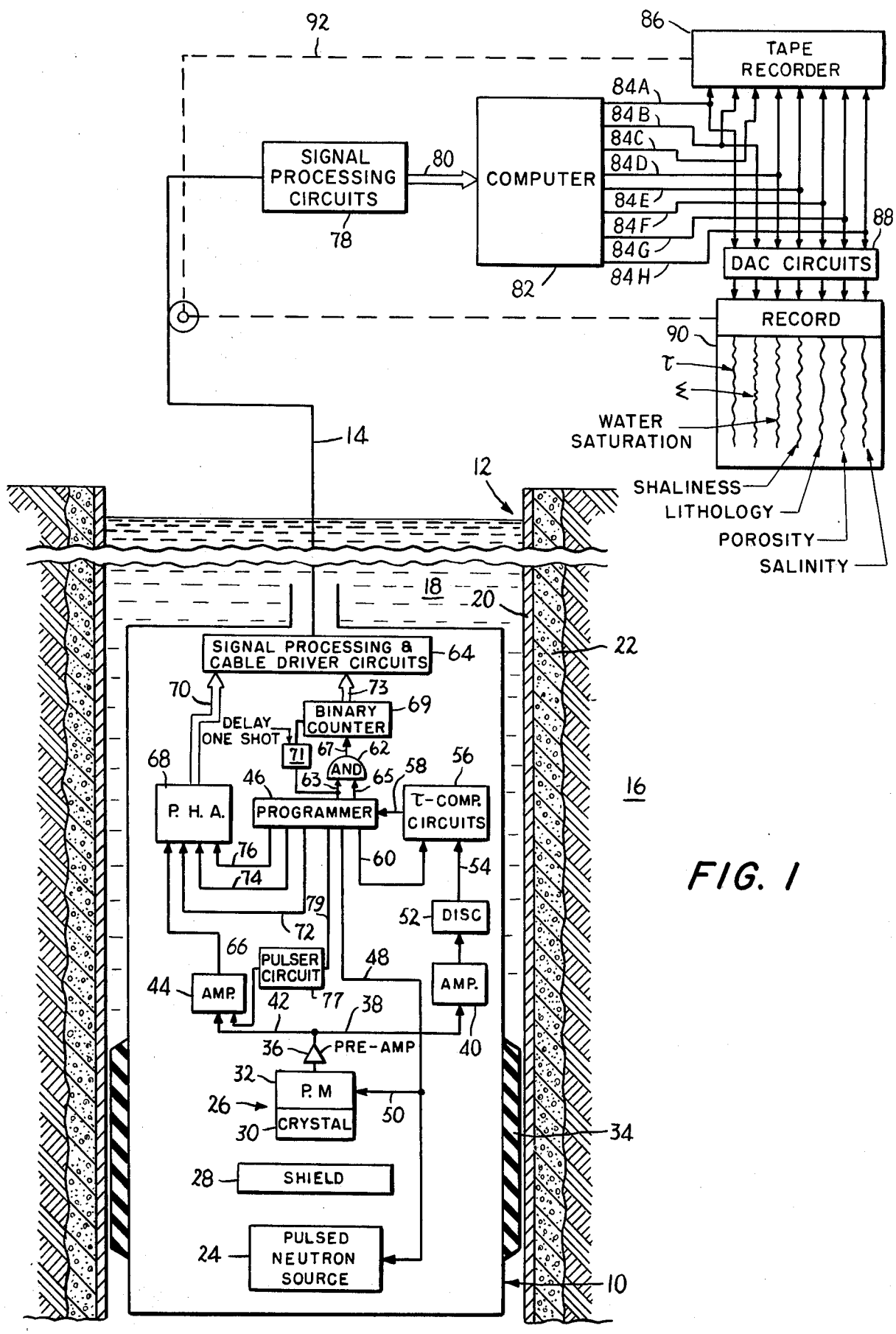
FIG. 1 is a schematic block diagram of an illustrative embodiment of the invention.

Referring now to FIG. 1, a representative embodiment of the invention includes a fluid-tight, pressure- and temperature-resistant well tool 10 that is adapted to be suspended in a well bore 12 by an armored cable 14 for investigating a subsurface earth formation 16. The well bore or borehole 12 is illustrated as containing a well fluid 18 and as including a steel casing 20 and a surrounding annulus of cement 22. Although no tubing is shown in the well bore, the tool if desired may be sized for through-tubing use.

The well tool 10 includes a pulsed neutron source 24 and a radiation detector 26 positioned in spaced relation to the source 24. A neutron shield 28 of conventional composition is preferably located between the source 24 and the detector 26 to reduce direct neutron irradiation of the detector. The neutron source 24 is adapted to generate discrete pulses of fast neutrons, e.g., 14 Mev, and suitably may be of the types described in more complete detail in U.S. Pat. No. 2,991,364 to C. Goodman, dated July 4, 1961, and U.S. Pat. No. 3,546,512, granted to A. H. Frentrop on Dec. 8, 1970, both of which are commonly owned with this application. The detector 26 may be of any construction appropriate to the detection of gamma rays and to the production of a pulse signal in response to each detected gamma ray having an amplitude representative of the energy of the gamma ray. It typically includes a scintillation crystal 30 which is optically coupled in conventional fashion to a photomultiplier tube 32. The crystal 30 preferably is of the thallium-activated sodium iodide type, although any suitable crystal, such as thallium or sodium activated cesium iodide, may be used. Alternatively, a solid state detector, having for example a germanium (lithium) crystal, might be employed. Power for the well tool 10 is supplied over the cable 14 from a surface power source (not shown), and it will be understood that the suitable power sources (not shown) are included in the tool 10 to drive the neutron source 24, detector 26 and other well tool equipment.

A boron-carbide impregnated sleeve 34 surrounds the tool 10 in the region of the source 24 and the detector 26. The sleeve is slotted longitudinally to allow passage of well fluid along the tool and preferably is as large in diameter as is commensurate with free movement of the tool within the casing 20. The sleeve 34 reduces the number of undesired gamma rays reaching the detector 26 in several ways; it displaces the well fluid 18 from the vicinity of the tool, thereby minimizing gamma rays originating from neutron interactions with the well fluid, and also acts as a sink for neutrons in the immediate region of the detector, so as to reduce gamma rays arising from neutron interactions with the tubing or casing, or from the activation of iron and other elements in the tool itself.

Pulses from the photomultiplier 32 are amplified in a preamp 36 and then applied, on the one hand, over a conductor 38 to the input of an amplifier 40, for use in the derivation of $\tau$, and, on the other hand, over a conductor 42 to the input of an amplifier 44, for spectral analysis. If desired, separate detectors may be emloyed for the $\tau$ and spectroscopy functions. If so, the spectroscopy-related detector should be of the gamma ray energy-responsive type, as described, but the $\tau$-related detector need not be; for example, the $\tau$-related detector could be of the thermal neutron-sensitive type, such as a helium-3 filled proportional counter. In any event, during and immediately after a neutron pulse is generated by the source 24 there will be an extremely high incidence of gamma rays at the detector 26 (or detectors) which would be productive of a correspondingly high rate of pulses in the photomultiplier 32. Except when gamma radiation during this time period is to be measured, the photomultiplier preferably is blocked during the pulse and for a short period thereafter to protect the photomultiplier 32, the amplifiers 40 and 44 and other signal processing electronics against adverse effects resulting from the unusually high count rates. As will be described more fully hereinafter, the operation of the source 24 advantageously is controlled by signals generated by a programmer 46 and transmitted to it over a conductor 48. These signals may also be utilized, as indicated by the conductor 50, to switch off the photomultiplier for the desired length of time.

Pulses from the amplifier 40 are applied to a discriminator 52 which passes only those pulses above a predetermined amplitude level and which converts the incoming pulses to standard size output pulses. These pulses are then coupled over a conductor 54 to the $\tau$-computation circuits 56, the specific construction of which may be in accordance with the teachings of Frentrop et al. U.S. Pat. No. 3,662,179.

As described in that patent, the $\tau$-computation circuits 56 include gating, counting, comparator and oscillator circuits responsive to pulses passed by the discriminator 52 during a detection period of variable time of occurrence following selected neutron pulses for solving the equation:

$$N = \tfrac{1}{2}(N_1 + N_3) - N_2 \qquad (1)$$

where:

$N_1$ is the number of counts during a first detection interval or gate (I) of $1\tau$ duration that begins $2\tau$ after the preceding neutron pulse is terminated;

$N_2$ is the number of counts during a second detection interval or gate (II) which begins immediately after the first interval and is $2\tau$ in length; and $N_3$ is the number of counts during a third detection interval or gate (III) which is initiated $6\tau$ after the end of the preceding neutron phase and which is $3\tau$ in duration.

$N_3$ is determined to correct the counts $N_1$ and $N_2$ from the principal intervals I and II, respectively, for background gamma radiation, and therefore may be omitted when the $\tau$-related detector is not sensitive to gamma radiation.

If the solution of equation (1) indicates that $N = 0$, the apparent value of the decay time derived by the circuits 56 may be taken as the actual decay time of the formation under investigation. If N departs from 0, an error signal is generated within the circuits 56, by regulation of a variable frequency oscillator, which tends to restore the system to an $N = 0$ condition. As is further described in Frentrop et al. U.S. Pat. No. 3,662,179, the variable frequency oscillator may comprise a digital oscillator including a 100 KHz clock signal circuit and a desired number of oscillator flip-flop circuits. The flip-flop circuits change state in accordance with the 100 KHz clock signals, and the states of the flip-flops are continuously compared with a corresponding number of flip-flops in the detector signal counting circuits (of the $\tau$-computation circuits 56) by means of a corresponding number of comparators. When the counter and oscillator flip-flop circuits are in the same condition, a pulse is generated that resets all of the oscillator flip-flops. This technique in effect converts a count rate signal into a time signal since the oscillator flip-flop circuits change individual states until they match the states of the counter flip-flop circuits that represent the observed radiation registered by the counter. Accordingly, the output signals generated by the oscillator represent the time required for the oscillator to count up to a predetermined level of radioactivity and thus are representative of the thermal neutron decay time of the formation. The oscillator output signals are coupled over a conductor 58 as an error or control signal for controlling the operation of the programmer 46.

A greater degree of confidence in the derived value of $\tau$ may be obtained by increasing the frequency of the clock or by adding more stages to the clock-driven arrays of flip-flop circuits. For example, a frequency of 300 KHz might be employed. Also, the clock-driven arrays of flip-flops might be scaled to provide a high initial counting rate which decreases exponentially with time after a neutron pulse. This would provide greater stability in the $\tau$-computation circuits 56, particularly at low $\tau$ values, since the change in $\tau$ produced by the error signal generated would always be comparatively small in relation to the absolute value of $\tau$. It would also make possible the use of a counter of smaller capacity.

The programmer 46 may comprise a counter with suitable diode matrix logic circuits. Programmers of this type are described in Nelligan U.S. Pat. No. 3,566,116, Schwartz U.S. Pat. No. 3,609,366, and Frentrop et al. U.S. Pat. No. 3,662,179. It may include the usual logic and signal combining circuitry, such as that described by Frentrop et al., needed to generate in response to the output signal train from the oscillator of the $\tau$-computation circuits 56 gate enabling signals for the $\tau$-detection intervals I, II and III. These signals are transmitted to the $\tau$-computation circuits 56 over a conductor 60, where they control the operation of the gating circuits and the pulse counting circuits in the foregoing manner. The programmer 46 also includes circuits for generating control signals that regulate the duration and repetition rate of the neutron pulses emitted by the source 24. Inasmuch as the time of occurrence (initiation and duration) of the $\tau$-detection intervals I, II and III are related to the time of occurrence of the associated neutron pulses, the τ-gate enabling pulses on conductor 60 are also synchronously related to the control signals transmitted over the conductor 48 to the neutron source 24. A preferred pulsing sequence of the source 24 and gating sequence of the τ-computation circuits 56 are described hereinafter in connection with FIGS. 2 and 3.

The programmer 46 may further be constructed to generate a signal representative of τ (or Σ) for transmission to the surface, and this too may be accomplished in accordance with the Frentrop et al. disclosure. Alternatively, the number of times the neutron source 24 is pulsed, and preferably just those times following which τ-detection periods are sequenced, may be counted for a predetermied period of time. Since the repetition rate of the neutron pulses is controlled as a function of τ, the number of pulses generated during the predetermined time period is proportional to Σ, and hence to τ. The counting time period should of course be of sufficient duration for statistically reliable measurements and should be repeated at a frequency productive of the vertical resolution desired in the τ-Σ logs. Expedient circuitry for this purpose could include (see FIG. 1) an AND gate 62, responsive to an enabling signal on a conductor 63 from the programmer 46, for passing pulses on a conductor 65 generated by the programmer 46 in synchronism with the control signals for the particular neutron pulses to be counted. The gated pulses are applied over a conductor 67 to a binary counter 69. Upon termination of the counting period, a delay one-shot 71, energized for example by the trailing edge of the gate enabling signal on conductor 63, instructs the counter 69 first to output binary-coded parallel signals indicative of the registered pulse count over a conductor bundle 73 to the signal processing and cable driver circuits 64 and then to reset to zero.

Returning now to the spectroscopy aspects of the invention, output pulses from the amplifier 44 are applied over a conductor 66 to a pulse height analyzer 68. The pulse height analyzer 68 may be of any conventional type, such as a single-ramp (Wilkinson rundown) type, which is operative to select pulses according to their amplitude and to apply them, suitably in binary-coded parallel form, to corresponding channels in an output conductor bundle 70 for application to the signal processing and cable driver circuits 64. It will be understood to include the usual low-level and high-level discriminators, for selection of the energy range to be analyzed, and linear gating circuits, for control of the time portion of the detector-generated pulses to be analyzed. To that end, appropriate signals are generated by the programmer 46 and sent on conductors 72, 74 and 76, respectively, to adjust the discriminators and to enable the linear gating circuits. While the portion of the time distribution of signals following each neutron pulse selected for analysis may correspond to any desired portion of the time distribution of gamma rays resulting from the neutron pulse, it preferably will correspond to gamma rays produced by thermal neutron capture interactions with nuclei of the formation. The programmer 46 is therefore preferably constructed to generate the enabling signals on conductor 76 such that the linear gating circuits will be open during a time period following each neutron pulse when formation capture gamma rays are predominant. In accordance with a later-described feature of the invention, the time of occurrence of this gating (detection) period is controlled in relation to the preceding neutron pulse as a function of τ as measured by the circuits 56. To that end, the programmer 46 includes suitable logic and signal combining circuitry for producing the desired gate enabling signals in synchronism with the occurrence of the associated neutron pulses.

The portion of the entire energy spectrum of the gamma rays corresponding to the gated detector signals which is to be analyzed may also be selected as desired, and illustratively might extend from 1.5 Mev to 7.5 Mev. The number of channels used over the energy range of interest is of course dependent upon the desired precision of analysis and the resolution capabilities of the scintillation crystal used. With a thallium-activated sodium iodide crystal, on the order of 200 channels over the energy range of from 1.5 Mev to 7.5 Mev has been found to afford satisfactory spectrum analysis. However, fewer channels, e.g., 50 or so, may be used if desired. Generally, the number of channels, channel width, total energy range, and other characteristics of the analyzer 68 may be determined in accordance with the teachings of Moran et al. U.S. Pat. No. 3,521,064.

The processing and driver circuits 64 may be of any conventional construction for encoding, time division multiplexing, or otherwise preparing the data-bearing signals applied to them in a desired manner and for impressing them on the cable 14, and the specific forms of the circuits employed for these purposes do not characterize the invention. Preferred constructions of the circuits 64 are described and illustrated in the copending commonly assigned application Ser. No. 563,507 of William B. Nelligan, filed Mar. 31, 1975, for "System for Telemetering Well-Logging Data."

At the earth's surface, the Σ-related signals from the binary counter 69 and the counts-per-channel signals from pulse height analyzer 68 are amplified, decoded, and otherwise processed as needed in circuits 78 for coupling over a conductor bundle 80 to a computer 82. The computer develops values of one or both of Σ and τ and of the desired spectroscopy outputs, such as, for example, values indicative of water saturation, shaliness, lithology, porosity, water salinity, etc. Preferred forms of the spectroscopy outputs are described hereinafter. Digital representations of these values are transmitted through conductors 84A–84H to a tape recorder 86 and to digital-to-analog converter (DAC) circuits 88, which generate analog signals proportional to the respective inputs for application to a visual recorder 90. Monitoring data (not illustrated), such as the average count rate during the first τ-detection interval (I) or the head voltage for example, may also be recorded. The tape recorder 86 and the visual recorder 90 are conventional and are suitable to produce the customary record of logging signals as a function of tool depth. The usual cable-following mechanical linkage, indicated diagrammatically at 92 in FIG. 1, is provided for this purpose.

The computer 82 may take any construction appropriate to the performance of the foregoing Σ and τ computations and of the spectrum matching, constituent proportions determining, and ratio forming procedures described in the Moran et al. U.S. Pat. No. 3,521,064. For example, it may comprise a general purpose digital computer of the type manufactured by Digital Equipment Corporation, Maynard, Massachusetts under the designation PDP-11. The computer may be located at the well site, as illustrated in FIG. 1, or it may be located remotely and operate on recorded representations of the counts per channel, τ and Σ data, such as would be made, for example, by recording the decoded signals from the processing circuits 78 on magnetic tape.

Figure 2:
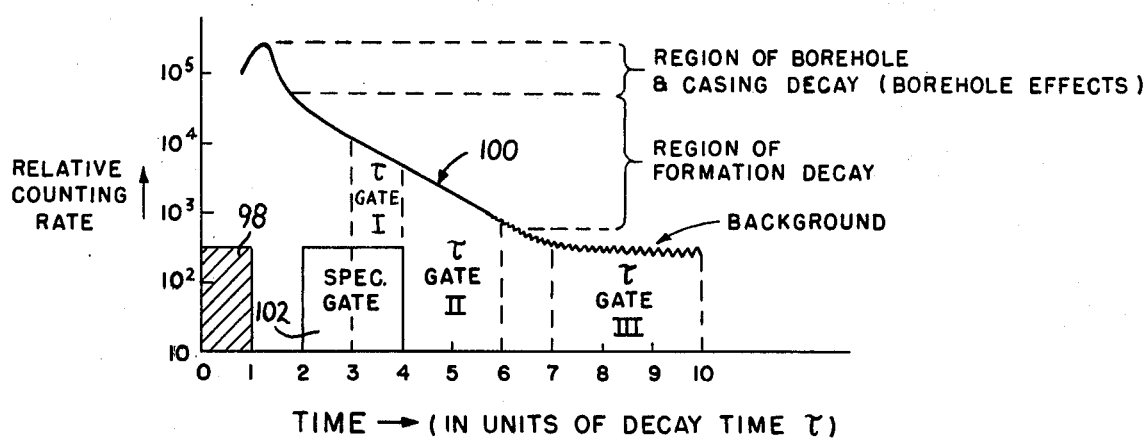
FIG. 2 is a graphical representation of the time distribution of capture gamma rays, plotted as a function of $\tau$, following irradiation of a formation with a pulse of fast neutrons, and showing preferred timings of the spectroscopy and decay time detection periods according to the invention.
Figure 3:
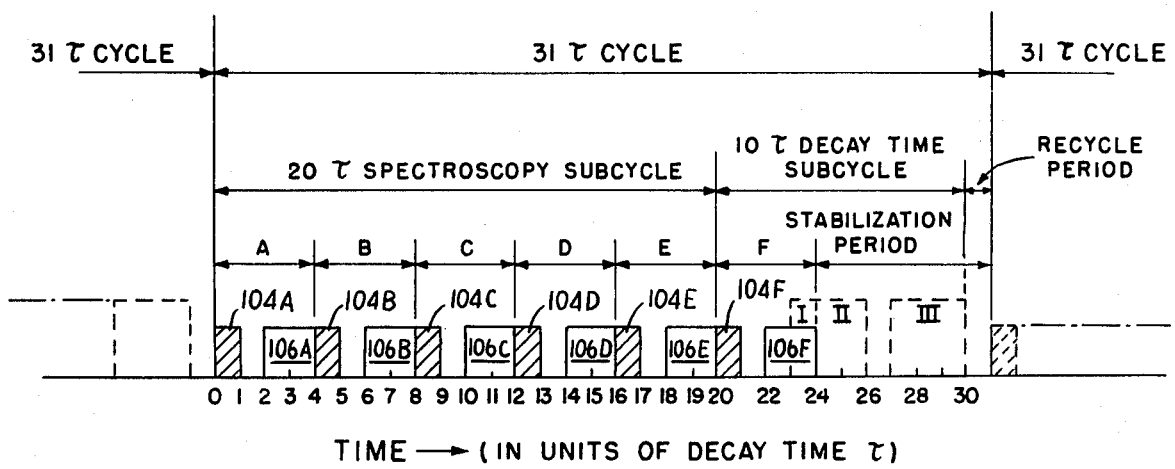
FIG. 3 portrays one embodiment of a basic operating cycle for the combined decay time-spectroscopy functions of the invention.

It is a feature of the invention that the perturbational effects of the analysis of formation capture gamma ray spectra of gamma radiation arising from neutron interactions with materials in the immediate vicinity of the neutron source 24 and the detector 26 (the tool housing, well fluid 18, casing 20, cement annulus 22, etc.) the so-called "borehole effects," are substantially reduced by controlling the time of occurrence in the spectroscopy detection period relative to the time of occurrence of the associated neutron pulse in accordance with a measured value of $\tau$ of the particular formation to be analyzed. This is illustrated in FIG. 2, which shows schematically how the capture gamma ray count rate might typically vary with time, indicated in terms of the decay time $\tau$, after a fast neutron burst 98. At the extreme left of the time distribution curve 100, there is a region of rapid decay due to early borehole effects, i.e., to high absorption rates of thermal neutrons in the well bore media immediately surrounding the source and detector. Next, there is a practically straight-line region which, in accordance with the Nelligan teachings, is the useful part of the curve for determining the thermal neutron decay time, corresponding on a semi-log plot to exponential decay of the thermal neutron density in the formation. Finally, toward the right, the curve 100 flattens out, with the count rates in this region corresponding to background radioactivity in the formation and in the well bore.

For purposes of computing $\tau$, Nelligan has determined that a $2\tau$ delay after the neutron pulse before beginning the detection period eliminates most of the undesirable borehole effects and places the initial part of the first detection interval (I) on the exponential decay region of the curve 100; and the gating circuits of the $\tau$-computation circuits 56 are controlled accordingly. The above-described $\tau$-gating sequence (two contiguous principal intervals I and II of $1\tau$ and $2\tau$, respectively, and a background interval III of $3\tau$ spaced by $1\tau$ from interval II, for an overall detection period of $7\tau$) is illustrated in FIG. 2, but as Nelligan describes, other overall $\tau$-detection periods, and other detection intervals within the overall period, may be employed. In any event, the time placement of the $\tau$-detection period will be controlled automatically in accordance with the $\tau$ of the particular formation under study.

For capture gamma spectroscopy purposes, it has been found that a spectroscopy detection period, designated 102 in FIG. 2, of $2\tau$ duration beginning after a delay of $1\tau$ following the termination of the preceding neutron pulse 98 satisfactorily eliminates early borehole effects and at the same time affords high counting rates for improved statistics and better vertical resolution. As the timing of the spectroscopy detection period is thus also keyed to a measured neutron characteristic of the formation, the spectroscopy period is automatically controlled in a correct way from formation to formation. Other time placements of the detection period 102 may of course be used. Generally, however, the timing of the period should be such as to maximize formation capture gamma count rates relative to background count rates in a way commensurate with the suppression of borehole effects.

To further enhance the efficiency of the logging system and to further increase count rates, the duration and repetition rate of the neutron pulses are also controlled in accordance with $\tau$. According to the invention, the individual neutron pulses are preferably of $1\tau$ duration. Moreover, a pedetermined number of time-spaced neutron pulses is preferably generated in cyclical fashion during each of a succession of time intervals or cycles. A preferred basic cycle, of $31\tau$ duration, is depicted schematically in FIG. 3. It includes a $20\tau$ spectroscopy subcycle, a $10\tau$ decay time subcycle, and a $1\tau$ recycling period. The spectroscopy subcycle consists of a total of five intervals, indicated at A, B, C, D and E, each of which is of $4\tau$ duration and each of which includes a neutron pulse 104A–104E of $1\tau$ duration and an associated spectroscopy detection period 106A–106E of $2\tau$ duration. Each detection period 106A–106E is timed in relation to the associated neutron pulse 104A–104E in the manner previously described in connection with the spectroscopy gate 102 of FIG. 2. Preferably, each neutron pulse 104A–104E is generated concurrently with the termination of the preceding spectroscopy detection period 106A–106E, so that during the spectroscopy subcycle the neutron pulses occur at intervals of $4\tau$.

The decay time subcycle begins with the sixth neutron pulse 104F in the overall $31\tau$ cycle. This pulse also preferably occurs immediately after the preceding spectroscopy detection period 106E. Although the principal function of the decay time subcycle is to allow determination of $\tau$, a sixth spectroscopy detection period 106F is also included in the subcycle. The decay time subcycle of course also includes the two principal $\tau$ detection intervals (I and II) and, where the $\tau$-related detector is a gamma ray detector, the background detection interval (III), placed as described in FIG. 2. The final $1\tau$ interval is included in the $31\tau$ cycle to provide for recycling of the programmer 46 and for spectroscopy stabilization, as described hereinafter.

The foregoing $31\tau$ cycle is successively repeated as the tool is moved through the well bore, the decay time is repeatedly determined by the $\tau$-computation circuits 56 and, under the control of the programmer 46, the times of occurrence of the neutron pulses 104A–104F, the associated spectroscopy detection periods 106A–106F and the $\tau$-detection intervals (I, II and III) are continuously adjusted in accordance with the measured values of $\tau$. The spectroscopy detection periods 106A–106F and the $\tau$-detection period are thus automatically placed on the proper region of the gamma ray time distribution curve following each neutron pulse for optimum measurement of the gamma ray activity for the respective spectroscopy and $\tau$ functions. Furthermore, the neutron source pulsing and detector gating sequences composing the overall $31\tau$ cycle provide both a large spectroscopy duty cycle ($12\tau$ out of every $31\tau$), with correspondingly high count rates for spectrum analysis purposes, and a frequent $\tau$ sampling (once in every $31\tau$), for fast response to changes in formation conditions.

The resolution quality of the gamma ray energy spectra provided by the well tool 10 is of course dependent upon the stability of energy response to the detector-analyzer system. Moreover, where the Moran et al. spectrum-matching technique is employed, it is important for accurate results that the energy response charcteristics of the system be substantially the same when the known constituent spectra are made and when the formation spectrum is detected. Desirably, therefore, provision is made for repeatedly examining the response of the system during use and for promptly compensating for any instabilities detected. Such instabilities commonly result, for example, from the sensitivity of the detector crystal, photomultiplier and downhole electronics to temperature variation in the well bore, as well as to other operating conditions, and often manifest themselves as variations in the pulse amplification (gain) of the detector-analyzer circuitry or in the pulse height/channel relationship of the pulse sorting circuitry of the pulse height analyzer. Detection and compensation of such errors may be accomplished at any suitable time and in any suitable manner. Conveniently, however, it is carried out during the period from $24\tau$ to $31\tau$ (denoted the stabilization period in FIG. 3) within each overall $31\tau$ cycle and in accordance with one of the following procedures.

A natural gamma ray emitter, preferably having a peak energy lower than the gamma energy range to be analyzed (e.g. 1.5 to 7.5 Mev), is mounted in close proximity to the detector 26, and a specified channel or portion of a channel is assigned to the peak energy within the pulse height analyzer 68. For instance, a zinc 65 source, having 1.11 Mev gamma, could be used for this purpose. The energy response of the detector-analyzer system during operation may then be checked for accuracy by determining whether it is adhering to the specified energy/channel relationship established for the zinc 65 peak. This may be done by counting the number of zinc 65 pulses falling within a particular number of channels (energy band) on either side of the channel location assigned to the 1.11 Mev energy level, comparing the respective counts with one another, and generating an error signal if one total count is greater than the other to adjust the response of the detector-analyzer system, e.g., by adjusting the voltage of the power supply for photomultiplier 32, such as to re-establish the 1.11 Mev energy level at the specified channel location. This procedure corrects for gain variations anywhere in the detector-analyzer system.

Circuits for performing gain control functions in this way in the well tool are described in U.S. Pat. No. 2,956,165, granted on Oct. 11, 1960 to F. F. Johnson and assigned to the assignee of this application. Alternatively, the counting and comparison steps could be readily carried out by the computer 82, which could then generate an error signal of the proper magnitude and polarity for control of the photomultiplier power supply. In another form, the computer could be arranged to compute the centroid of the zinc 65 peak in terms of its channel location from counts representing a small range of gamma ray energies spanning the peak, either with or without subtraction of background, and thereafter to produce the required error signal to restore the prescribed 1.11 Mev/channel relationship.

In order not to tie up the pulse height analyzer 68 during the spectroscopy detection periods 106A–106F due to the contribution of the zinc 65 source, its lower discriminator level preferably is set to pass only pulses above 1.11 Mev. The lower level may be set, for example, at close to 1.5 Mev, and normally would be maintained at this level throughout each $31\tau$ cycle except during the stabilization period from $24\tau$ to $31\tau$. At $24\tau$ in each gain-control cycle, the lower discriminator level is adjusted down to pass pulses corresponding to the zinc 65 gammas and is held at the lower level until $31\tau$, whereupon it is returned to its normal higher level. Control signals for this purpose are generated by the programmer 46, which includes logic and signal combining circuits appropriate to that end, and are coupled to the pulse height analyzer 68 over the conductor 72 (see FIG. 1). Similarly, gate enabling signals are generated by the programmer 46 and applied, over conductor 76, to the linear gating circuits (not shown) of pulse height analyzer 68 to enable passage of the zinc 65 pulses to the pulse-sorting circuits during the stabilization period.

Figure 4:
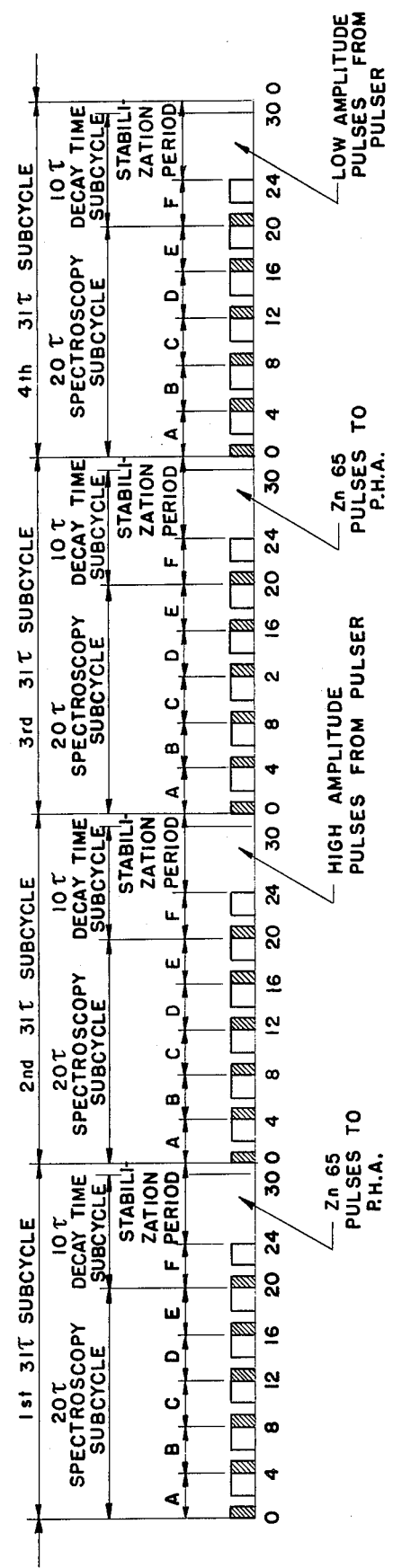
FIG. 4 illustrates an exemplary scheme for transmitting calibration pulses to the spectroscopy circuitry.

In addition to the foregoing gain control, it is also desirable to compensate for any drift or offset in the pulse height/channel relationship of the pulse height analyzer. A form of apparatus particularly adapted to such offset control is described in copending, commonly owned U.S. application Ser. No. 563,510, filed Mar. 31, 1975, for "Methods and Apparatus for Pulse Height Analyzer Offset Control" by Richard Murphy. According to Murphy's teachings, a pulser circuit 77 (FIG. 1) is coupled to the pulse height analyzer 68, through amplifier 44, and alternately transmits to it, upon receipt over conductor 79 of command signals from the programmer 46, a low amplitude pulse and a high amplitude pulse, the ratio of which is substantially constant over a wide temperature range. Transmission of the pulses to the analyzer may be phased with transmission of zinc 65 pulses in any convenient way. For example, the discriminator of the analyzer may be adjusted to admit the zinc 65 pulses during the stabilization periods of alternate $31\tau$ cycles, as depicted in the first and third $31\tau$ cycles of the sequence of FIG. 4, and the low and high pulses transmitted during the stabilization periods of each or alternate ones of the remaining $31\tau$ cycles. FIG. 4 illustrates transmission of the high amplitude pulses during the second $31\tau$ cycle and transmission of the low amplitude pulses during the fourth $31\tau$ cycle. The channel locations assigned to the respective low and high amplitude pulses by the analyzer 68 are determined, e.g., by the same techniques used to locate the zinc 65 peak, and the ratio of the channel locations is formed. As the pulse-sorting circuits of the analyzer 68 see the pulses as affected by any offset in the pulse height/channel relationship, the ratio of the channel locations to which they are assigned will likewise be influenced by any such offset. Hence, by comparing this ratio with the known ratio of the pulser circuit outputs, an error signal may be generated, should any difference between the two ratios be detected, in a way to eliminate the corresponding offset, thereby restoring the correct pulse height/channel relationship. Conveniently, this may be done through appropriate adjustment of the zero discriminator level of the pulse height analyzer.

As an alternative procedure, a second prominent gamma ray peak may be used in conjunction with the zinc 65 peak or another energy peak in place of the Murphy pulser circuitry. The second peak need only be spaced in energy from the first, and could be below, within or above the energy range to be analyzed. The 0.51 Mev peak of zinc 65, for example, might be used, or sodium 24, having 1.38 Mev and 2.76 Mev gamma peaks, might be employed in place of zinc 65. Again, the capture gamma peak for oxygen at 6.1 Mev might be used, together with a low energy natural emitter, for this purpose. The channel location of the second peak could be determined in the same manner as the zinc 65 1.11 Mev peak and the ratio of the two channel locations taken. This ratio would be compared with the calibrated channel ratio for the two energy peaks in question and an error signal corrective of any disparity between the detected ratio and the correct ratio developed. As with the pulser system, this error signal could be applied to the zero discriminator of the pulse height analyzer 68 to eliminate the offset productive of the error.

If either (or both) calibration energy peak selected falls within the energy range being analyzed, as would the 6.1 Mev oxygen capture gamma peak in the case of the aforementioned 1.5 to 7.5 Mev range, it would of course contribute to the gamma rays detected during the spectroscopy detection periods 106A-106F. It would therefore have to be taken into account if the analysis is accomplished by means of the spectrum-matching techniques of Moran et al. U.S. Pat. No. 3,521,064. This could be done by including the capture gamma ray spectra of that emitter among the constituent spectra used in making up the composite spectrum with which the detected spectrum is compared.

Turning now with more particularity to the analysis of the detected capture gamma ray spectra and to the spectroscopy outputs developed by the computer 82, the computer performs essentially the same functions as the constituent proportion computer 39 of the Moran et al. U.S. Pat. No. 3,521,064. That is to say, it determines the composition of an unknown formation by comparing the magnitudes of the detected capture gamma ray spectrum of the formation at a large number of energy points or levels with a composite spectrum, made up of weighted proportions of individual spectra of a number of constituent materials or of specific combinations of materials that are postulated to comprise the formation, to obtain the best possible match, preferably by the "least squares fit" method, and deriving indications of the relative proportions of the constituent materials productive of the match. The factors bearing on the selection of the particular constituent materials to be included in the composite spectrum, the manner of measurement of the individual constituent spectra, the construction of the composite spectrum, the application of the "least squares" criterion to establish a "best fit" condition between the detected spectrum and the composite spectrum, and the otherwise implementation of the Moran et al. technique to provide the desired information as to the unknown proportions $\omega_i$ of the postulated constituent materials in the formation are fully described and developed in U.S. Pat. No. 3,521,064 and therefore are no repeated in full here, but are incorporated by reference.

Briefly, however, in accordance with the Moran et al. disclosure it is assumed that the formation is constituted primarily by no more than a number of $\eta$ of postulated constituent materials or elements, e.g., hydrogen, chlorine, silicon, calcium, iron and oxygen; and the composite spectrum with which the detected formation spectrum is matched thus comprises the individual capture gamma ray spectra for these elements (preferably including the secondary activation gamma ray spectrum for oxygen). By combining functions $G_k$ of the gamma ray count amplitudes at a selected number of energy levels (no less than $n$) in the detected gamma ray spectrum with amplitude coefficients $a_{ik}$, which are determined beforehand from the individual known spectra and preset into the computer 82 as specified by Moran et al., a set of linear equations in the form of equations $3a$–$3n$ is solved by the computer.

$$\omega_{i=1} = a_{11}G_1 + a_{12}G_2 + a_{13}G_3 + a_{1n}G_n \qquad (3a)$$

$$\omega_{i=2} = a_{21}G_1 + a_{22}G_2 + a_{23}G_3 + a_{2n}G_n \qquad (3b)$$

$$\omega_{i=3} = a_{31}G_1 + a_{32}G_2 + a_{33}G_3 + a_{3n}G_n \qquad (3c)$$

$$\cdots$$

$$\cdots$$

$$\omega_{i=n} = a_{n1}G_1 + a_{n2}G_2 + a_{n3}G_3 + a_{nn}G_n \qquad (3n)$$

Since the number of equations $3a$–$3n$ equals the number $n$ of constituent materials postulated to be in the formation, the computer 82 automatically develops all of the unknown $\omega_i$ weighting or constituent proportion factors. As these $\omega_i$ factors are representative of the contributions of the respective constituent materials to the composite spectrum, they are likewise representative of the relative proportions of the individual constituent materials in the formation. Representations of the factors for each of the $n$ constituents are furnished to the magnetic tape recorder 86 over conductor 84C for recording as a function of tool depth.

As is further provided by Moran et al. in U.S. Pat. No. 3,521,064, the computer 82 may be arranged to form ratios of selected constituent proportion factors $\omega_i$ to derive indications of certain properties of the formation. For example, spectroscopy outputs might be generated by the computer 82, and supplied to the converter circuits 88 and visual recorder 90 and to the tape recorder 86 over conductors 84D–84H, of such formation properties as salinity, porosity, lithology, shaliness and water saturation. Indications of other properties may also be developed if desired.

An illustrative ratio useful in deriving an indication of salinity might be $\omega_{Cl}/\omega_H$, i.e., the weighting factor $\omega$ for chlorine over the weighting factor $\omega$ for hydrogen. The numerical value of this ratio might therefore be recorded as a salinity indicator This indicator may be quantified by correlation with calibration curves developed in formations of known salinity. If desired, the correlation could be carried out by the computer 82, or in the recorder 90, by application of an appropriate conversion factor and recordings made directly of the quantitative values thus obtained either in addition to or in place of the ratio indicator.

A suitable ratio for indicating the porosity might, for example, take the form $a\omega_H/(b\omega_{Si} + c\omega_{Ca})$, where $\omega_{Si}$ and $\omega_{Ca}$ are the calculated proportion factors for silicon and calcium, respectively. The coefficients $a$, $b$ and $c$ (and hereinafter $d$) etc., account for the different gamma ray emission intensities of the respective elements for like neutron fluxes (owing to different microscopic capture cross sections and to different gamma rays/neutron capture interaction values), and are selected such that the individual terms in which they appear, e.g. $(b\omega_{Si} + c\omega_{Ca})$, are constant regardless of the specific amounts of the elements in the formation. Generally, the porosity ratio should be such as to represent the amount of fluid in the formation relative to the amount of matrix material, and any other form of ratio appropriate for that purpose may be employed. For instance, a ratio in the form of $a(b\omega_H + c\omega_{Cl})/(d\omega_{Si} + e\omega_{Ca})$ might be used instead of the aforementioned ratio. The latter ratio is actually more accurate than the former because it takes into account both hydrogen and chlorine, which are primarily properties of the formation fluid. The former ratio is a good approximation, however, because the fraction of hydrogen in water does not change rapidly with change in salinity (chlorine). As with the aforementioned salinity data, quantified values of porosity may also be derived by use of calibration curves, and this too could readily be implemented in the computer 82 or in the recorder 90.

For investigating the lithology of a formation, either one or both of two ratios may be taken to indicate whether the formation is limestone or sandstone. Thus, a suitable ratio for indicating limestone might be $\omega_{Si}/\omega\lambda_{Ca}$, while an appropriate sandstone indicator might be obtained by using $\omega_{Si}/(a\omega_{Si} + b\omega_{Ca})$. An alternative form of ratio which might be employed as a lithology indicator is $\omega_{Si}/(a\omega_{Si} + b\omega_{Ca} + c\omega_u)$, where $\omega_u$ is representative of one or more other constituents, such as oxygen, iron, etc., which are to be taken into account. Indicators for lithologies other than sandstone and limestone may of course be provided.

Experimental results have indicated that the ratios $\omega_{Fe}/\omega_{Si}$, where $\omega_{Fe}$ is the proportion factor for iron, and $\omega_{Fe}/\omega_{Ca}$ are both higher in shale formations than in non-shale formations. Hence, a shaliness indicator could be obtained by looking directly at either of these ratios. Alternatively, the ratio $\omega_{Fe}/(a\omega_{Si} + b\omega_{Ca})$ could be formed. This ratio has the advantage over either $\omega_{Fe}/\omega_{Si}$ or $\omega_{Fe}/\omega_{Ca}$ inasmuch as it takes into account that the shale matrix may include either silicon or calcium.

As a general matter, interpretation of $\tau$-$\Sigma$ logs is enhanced both qualitatively and quantitatively by the presence of accurate data as to such properties of the formation as lithology, shaliness, porosity and salinity. Combined logging of the foregoing characteristics and spectroscopy outputs in accordance with the present invention thus generally upgrades the knowledge obtainable from decay time logs as to formation hydrocarbon content and productivity. Furthermore, specific advantages are realized in certain conditions which heretofore have been troublesome. For example, certain formations of markedly different properties, such as shales and high salinity sands, have similar $\tau$ and $\Sigma$ values and consequently are not readily distinguishable by $\tau$-$\Sigma$ logs alone. However, by virtue of the additional information provided by the salinity and shaliness indicators of the present invention, such formations may be differentiated. Another specific area of improvement is in connection with low salinity (e.g., in the range of 20,000 ppm) formations, where the thermal neutron decay time log is known to be of questionable reliability. Here, the spectroscopy salinity output, e.g., the $\omega_{Cl}/\omega_H$ ratio, furnishes more accurate salinity measurements. These measurements may then be used instead of the salinity values derived from the decay time log to obtain water saturation values in a known manner. Suitably, calculation of water saturation values using the spectroscopy salinity measurements may be carried out in the computer 82, and the water saturation values thereby obtained plotted by the recorders 86 and 90, as illustrated in FIG. 1.

Although the invention has been described herein principally in terms of analysis of thermal neutron capture gamma ray energy spectra, it will be appreciated that gamma spectra resulting from other neutron interactions may be analyzed as well. Such other spectra might include, for instance, those produced by the inelastic scattering of fast neutrons and those representative of activation gamma rays. In the case of inelastic scattering gamma spectra, the spectroscopy gating circuits could be enabled, by signals from the programmer 46, over an appropriate length of time during and/or immediately following the occurrence of a neutron pulse generally as described in U.S. Pat. No. 2,991,364, granted July 4, 1961 to Clark Goodman and assigned to the assignee of the present application. If desired, the overall $31\tau$ operating sequence of FIG. 3 could be varied to omit the $20\tau$ capture gamma spectroscopy subcycle, retaining only the $10\tau$ thermal decay time subcycle. This would allow additional time for the decay of capture gamma rays between neutron pulses so as to reduce the magnitude of residual capture gamma rays during the next succeeding inelastic scattering gamma ray detection period.

Spectroscopy outputs developed from inelastic scattering gamma ray spectra analysis preferably would include outputs for carbon and oxygen. Such outputs could be obtained, as in the aforementioned Goodman patent, by windowing the carbon and oxygen inelastic gamma peaks, i.e., 4.4 Mev for carbon and 6.9 and 7.1 Mev for oxygen. Preferably, however, analysis of the inelastic scattering gamma spectra would be conducted using the Moran et al. spectrum-matching procedures described above. If so, separate constituent spectra would be selected for the inelastic scattering gamma analysis. These might include, for example, spectra for carbon, oxygen, silicon, calcium and hydrogen. It may also be desirable to include constituent spectra for residual capture gamma rays or other background gamma radiation. In any event, the aforementioned spectrum-matching procedures would be followed to derive the desired spectroscopy outputs, which might include, for example, proportion factors $\omega_i$ for calcium, carbon, oxygen, silicon and hydrogen and suitable ratios thereof. If both thermal neutron capture gamma spectroscopy outputs and inelastic scattering gamma spectroscopy outputs are desired, the different types of spectra may be detected and analyzed concurrently, i.e., during the same pass of the well tool, or each may be detected and analyzed separately during different, e.g., alternate, passes.

Concurrent detection and analysis could be accomplished by use of further linear gating circuits (not shown) interposed between the discriminators and the pulse-sorting circuits of pulse height analyzer 68 which are suitably engaged by signals from the programmer 46 to pass that portion of the time distribution of detector signals resulting from each neutron pulse, or selected neutron pulses, corresponding to inelastic scattering gamma rays. The capture gamma ray detection periods could be timed as before. The computer 82 would in this instance be arranged to apply the proper set of constituent spectra coefficients $a_{ik}$ to the respective detected inelastic scatter and capture gamma spectra.

The separate pass procedure could readily be implemented by means of switching circuitry, operable from the surface to select the appropriate detector gating sequences and to order the computer 82 to apply the appropriate constituent spectra coefficients for enabling analysis of the respective detected gamma ray energy spectra.

If desired, the number of individual spectra which must be provided in the composite spectrum may be reduced by subtracting certain individual spectra from the detected spectrum before fitting of the detected and the composite spectra. For example, the gamma ray spectrum for oxygen or iodine, or both, might be subtracted from the capture gamma ray spectrum generated during the spectroscopy periods. Again, the contributions to the detected gamma ray spectrum from comparatively long-lived emitters (such as oxygen) and from other background sources (such as the calibration source or sources, natural gamma radiation, radioactive salts in the well bore, etc.) may be taken into account by detecting such contributions during a time period following the spectroscopy periods and subtracting the background spectrum thus obtained from the detected spectroscopy spectrum. In the capture gamma ray measuring cycle of FIG. 3, for instance, the background spectrum suitably might be measured during the 24τ to 31τ stabilization period, with this spectrum then being subtracted on a proportionate basis from the capture gamma spectrum developed during the preceding spectroscopy periods 106A–106E. This can be readily accomplished in the computer 82. The resulting background-corrected spectrum would then be used in developing the desired spectroscopy outputs.

While the invention has been illustrated and described with reference to specific embodiments thereof, many modifications and variations of such embodiments may be made by one skilled in the art without departing from the inventive concepts disclosed. As an example, the specific neutron source employed could have a fixed pulse duration and repetition rate, and the time of occurrence of the τ detection period relative to the neutron pulses could also be fixed or controlled in some manner other than automatically in accordance with a measured value of a neutron characteristic of the formation. Accordingly, all such modifications and variations are intended to be included within the spirit and scope of the appended claims.

I claim:

1. Apparatus for investigating earth formations traversed by a well bore, comprising:
   a well tool adapted to be moved through the well bore;
   means carried by the well tool for irradiating the formation and other well bore media surrounding the well tool with at least two time-spaced pulses of fast neutrons;
   detector means carried by the well tool for detecting at least in part the time distribution of gamma rays resulting from neutron interactions with nuclei of the irradiated formation and other well bore media following each neutron pulse and for generating a corresponding time distribution of signals representative of the energies of the detected gamma rays;
   means responsive to signals generated by the detector means following the first of said neutron pulses for selecting a portion of the time distribution of signals following the second of said neutron pulses which corresponds to gamma rays resulting predominantly from thermal neutron capture interactions with nuclei of the irradiated formation; and
   means responsive to the detector signals within the selected portion of the time distribution of signals following said second neutron pulse for analyzing at least a portion of the energy spectrum of the detected capture gamma rays corresponding to the selected detector signals.

2. The apparatus of claim 1 wherein the signal-portion selecting means includes means responsive to detector signals generated following the first neutron pulse for measuring a neutron characteristic of the irradiated formation and for selecting said selected portion of the time distribution of signals following the second neutron pulse as a function of the measured neutron characteristic.

3. The apparatus of claim 2 wherein the signal-portion selecting means further includes means for controlling the time of occurrence of the second neutron pulse as a function of the measured neutron characteristic.

4. The apparatus of claim 3 wherein the signal-portion control means further includes means responsive to a synchronizing signal related to the time of occurrence of the second neutron pulse for selecting the time of occurrence of said selected signal portion as a function of the measured neutron characteristic.

5. The apparatus of claim 1 further comprising means for comparing the analyzed portion of the detected gamma ray spectrum with a composite energy spectrum, made up of weighted spectra of constituents postulated primarily to comprise the irradiated formation, to determine the proportions of the postulated constituents producing a composite spectrum which most nearly matches the analyzed portion of the detected gamma ray energy spectrum.

6. The apparatus of claim 5 further comprising means for recording representations of the determined proportions of constituents as a function of the depth of the well tool in the well bore.

7. Apparatus according to claim 1 further comprising:
   means for selecting a portion of the time distribution of signals following at least one of said at least two neutron pulses which corresponds to gamma rays resulting predominantly from fast neutron inelastic scattering interactions with nuclei of the irradiated formation; and wherein
   said analyzing means is operative in response to the detector signals within the selected inelastic scattering gamma ray portion of the time distribution of signals to analyze at least a portion of the energy spectrum of the detected inelastic scattering gamma rays corresponding thereto.

8. Apparatus for investigating an earth formation traversed by a well bore, comprising:
   means for irradiating the earth formation with at least two time-spaced pulses of fast neutrons;
   means responsive to representations of neutron interactions with nuclei of the formation following the first neutron pulse for measuring a selected neutron characteristic of the formation;
   detector means for detecting gamma rays resulting from neutron interactions with nuclei of the formation and for generating corresponding signals representative of the energies of the detected gamma rays;
   means for analyzing at least a portion of the energy spectrum of the gamma rays detected during a first detection period following the second neutron pulse; and
   control means for controlling the operation of the analyzing means as a function of the value of the selected neutron characteristic measured following the first neutron pulse such that the gamma rays detected during the first detection period result predominantly from thermal neutron capture interactions with formation nuclei.

9. The apparatus of claim 8 wherein:
   the neutron characteristic measuring means is responsive to representations of thermal neutron capture interactions with nuclei of the formation; and
   the neutron characteristic measured is a thermal neutron capture characteristic of the formation.

10. The apparatus of claim 8 wherein:
    the analyzing means includes first variable gate means responsive to a control signal related to the time of occurrence of the second neutron pulse for controlling the time of occurrence of the first detection period; and the control means includes means for generating the first gate control signal as a function of the measured value of the selected neutron characteristic.

11. The apparatus of claim 10 wherein:
the selected neutron characteristic is the thermal neutron decay time of the formation; and
the first gate control signal is generated so as to initiate the first detection period at at least one measured value of the decay time after termination of the second neutron pulse and to terminate the first detection period at at least two measured values of the decay time following the initiation thereof.

12. The apparatus of claim 10 wherein the control means includes means for generating a control signal for controlling the time of occurrence of the second neutron pulse as a function of the measured value of the neutron characteristic.

13. The apparatus of claim 10 wherein:
the neutron characteristic measuring means is responsive to signals generated by the detector means during a second detection period following a neutron pulse subsequent to the first neutron pulse and includes second variable gate means responsive to a control signal related to the time of occurrence of the subsequent neutron pulse for controlling the time of occurrence of the second detection period; and
the control means further includes means for generating the second gate control signal as a function of the measured value of the selected neutron characteristic.

14. The apparatus of claim 8 further comprising means for recording representations of the measured value of the selected neutron characteristic and of the analyzed portion of the detected gamma ray energy spectrum as a function of the depth of the formation beneath the earth's surface.

15. The apparatus of claim 8 further comprising means for comparing the analyzed portion of the detected gamma ray energy spectrum with a composite energy spectrum, made up of weighted spectra of constituents postulated primarily to comprise the irradiated formation, to determine the proportions of the postulated constituents producing a composite spectrum which most nearly matches the analyzed portion of the detected gamma ray energy spectrum.

16. Apparatus for investigating an earth formation traversed by a well bore, comprising:
means for irradiating the earth formation with a plurality of time-spaced pulses of fast neutrons during each of a succession of time intervals;
detector means for detecting gamma rays resulting from thermal neutron capture interactions with nuclei of the formation following the neutron pulses and for generating corresponding time distributions of signals representative of the energies of the detected gamma rays;
means responsive to signals generated by the detector means following one or more of the neutron pulses for analyzing at least a portion of the energy spectrum of the corresponding gamma rays;
means responsive to signals generated by the detector means following one or more selected neutron pulses for measuring a thermal neutron characteristic of the formation; and
control means for controlling the operation of the analyzing means as a function of the measured neutron characteristic.

17. The apparatus of claim 16 wherein:
the analyzing means includes first variable gate means responsive to a control signal related to the time of occurrence of each of said one or more neutron pulses for selecting a portion of said corresponding time distribution of signals; and
the control means includes means for generating the first gate control signal as a function of the measured neutron characteristic.

18. The apparatus of claim 17 wherein:
the measured neutron characteristic is the thermal neutron decay time; and
the first gate control signal is generated so as to initiate said selected signal portion at a time after termination of the preceding neutron pulse at least as long as one measured decay time and to terminate said selected signal portion at a time at least as long as two measured decay times after the initiation thereof.

19. The apparatus of claim 17 wherein the control means includes means for generating control signals for controlling the time of occurrence of each neutron pulse as a function of the measured neutron characteristic.

20. The apparatus of claim 19 wherein:
the neutron characteristic measuring means includes second variable gate means responsive to a control signal related to the time of occurrence of said selected neutron pulses for selecting a portion of said corresponding time distribution of signals; and
the control means further includes means for generating the second gate control signal as a function of the measured neutron characteristic.

21. The apparatus of claim 20 wherein:
the measured neutron characteristic is the thermal neutron decay time;
the neutron pulse control signals are generated such that the neutron pulses are each approximately one measured decay time in duration, said one or more neutron pulses are spaced at intervals of approximately four measured decay times in duration, and each of said selected neutron pulses is spaced from the next succeeding neutron pulse by an interval of at least ten decay times duration;
the first gate control signals are generated such that the corresponding selected signal portion is of approximately two measured decay times duration and is initiated at approximately one measured decay time after termination of the preceding neutron pulse; and
the second gate control signals are generated such that the corresponding selected signal portion is of approximately seven measured decay times duration and is initiated at approximately two measured decay times after termination of the preceding selected neutron pulse.

22. The apparatus of claim 16 further comprising means for comparing the analyzed portion of the detected gamma ray energy spectrum with a composite energy spectrum, made up of weighted spectra of constituents postulated primarily to comprise the irradiated formation, to determine the proportions of the postulated constituents producing a composite spectrum which most nearly matches the analyzed portion of the detected gamma ray energy spectrum.

23. The apparatus of claim 22 further comprising means for recording representations of the measured neutron characteristic and of the determined proportions of constituents as a function of the depth.

24. The apparatus of claim 16 further comprising means for generating calibration signals and for admitting said signals to the analyzing means during a predetermined time period within each time interval.

25. The apparatus of claim 24 wherein the analyzing means includes an analog-to-digital converter and wherein said calibration means comprises:
a source of gamma rays of known energy;
means for admitting signals generated by the detector means in response to said known energy gamma rays to said analog-to-digital converter during said predetermined time period for purposes of gain control; and
means for generating a first series of calibration signals of low amplitude and a second series of calibration signals of high amplitude and for admitting at least one of said first series of signals and said second series of signals to said analog-to-digital converter during said predetermined time period for purposes of controlling the offset of the analog-to-digital converter.

26. A method of investigating an earth formation traversed by a well bore, comprising:
obtaining representations of neutron interactions with nuclei of the formation following irradiation of the formation with a first pulse of fast neutrons;
deriving a measurement of a neutron characteristic of the formation from the first neutron pulse-related representations;
obtaining representations of the energies of gamma rays produced by thermal neutron capture interactions with nuclei of the formation during a first detection period following irradiation of the formation with a second pulse of fast neutrons;
analyzing at least a portion of the energy spectrum of the gamma rays corresponding to said second neutron pulse-related representations; and
controlling the timing of the first detection period as a function of the derived measurement of the neutron characteristic of the formation.

27. The method of claim 26 wherein the step of controlling the timing of the first detection period comprises:
generating a control signal in accordance with a representation of the derived measurement of the neutron characteristic; and
determining the time of occurrence of the first detection period in response to the control signal.

28. The method of claim 27 wherein the control signal is related to the time of occurrence of the second neutron pulse in accordance with a function of the derived neutron characteristic measurement.

29. The method of claim 28 wherein:
the neutron characteristic measured is the thermal neutron decay time of the formation; and
the control signal is generated so as to initiate the first detection period at approximately one measured decay time after termination of the second neutron pulse and to terminate the first detection period at approximately two measured decay times after initiation thereof.

30. The method of claim 26 wherein the spectrum analyzing step includes comparing the analyzed portion of the formation gamma energy ray spectrum with a composite energy spectrum, made up of weighted spectra of constituents postulated primarily to comprise the irradiated formation, to determine the proportions of the postulated constituents producing a composite spectrum which most nearly matches the analyzed portion of the formation gamma ray energy spectrum.

31. The method of claim 30 further comprising recording representations of the measured neutron characteristic and of the determined proportions as a function of the depth of the formation.

32. A method of investigating earth formations traversed by a well bore, comprising:
successively irradiating the formations with time-spaced pulses of fast neutrons;
deriving a measurement of a neutron characteristic of the formations following each of selected non-adjacent pulses in the succession of pulses;
analyzing at least a portion of the energy spectrum of the gamma rays produced by thermal neutron capture interactions with nuclei of the formations during a first detection period following each of one or more neutron pulses intermediate in the succession of pulses to the selected pulses; and
controlling the timing of each first detection period as a function of the measurement of the neutron characteristic derived following the selected neutron pulse next preceding said first detection period in the succession of pulses.

33. A method for investigating an earth formation traversed by a well bore, comprising:
irradiating the earth formation with a plurality of time-spaced pulses of fast neutrons during each of a succession of time intervals;
detecting gamma rays resulting from thermal neutron capture interactions with nuclei of the formation following the neutron pulses and generating corresponding signals representative of the energies of the detected gamma rays;
analyzing at least a portion of the energy spectrum of the gamma rays corresponding to signals generated during a first detection period following one or more of the neutron pulses of each time interval;
deriving a measurement of the thermal neutron decay time of the formation in response to signals generated during a second detection period following a neutron pulse in a first time interval in the succession of intervals; and
controlling the time of occurrence of each first detection period of a second time interval subsequent in the succession of intervals to the first time interval as a function of the neutron decay time measured in response to signals generated during the second detection period of the first time interval.

34. The method of claim 33 wherein the time of occurrence of each first detection period of the second time interval is controlled in relation to the time of occurrence of the associated neutron pulse as a function of the first-interval measured decay time.

35. The method of claim 34 wherein each first detection period of the second time interval is initiated at at least one first-interval measured decay time after termination of the associated neutron pulse and is terminated at at least two first-interval measured decay times after the initiation thereof.

36. The method of claim 34 further comprising controlling the time of occurrence of each neutron pulse of the second time interval as a function of the first-interval measured decay time.

37. The method of claim 36 further comprising:
controlling the time of occurrence of a second detection period following a neutron pulse of the second time interval as a function of the first-interval measured decay time; and
deriving a further measurement of the decay time in response to signals generated during the second detection period of the second time interval.

38. The method of claim 33 further comprising comparing the analyzed portion of the detected gamma ray energy spectrum with a composite energy spectrum, made up of weighted spectra of constituents postulated primarily to comprise the irradiated formation, to determine the proportions of the postulated constituents producing a composite spectrum which most nearly matches the analyzed portion of the detected gamma ray energy spectrum.

39. The method of claim 38 further comprising recording representations of the first-interval measured decay time and of the determined proportions of constituents as a function of depth.

40. A method for investigating earth formations traversed by a well bore, comprising:
moving a well tool through the well bore;
irradiating the formation and other well bore media surrounding the well tool with at least two time-spaced pulses of fast neutrons;
detecting at least in part the time distribution of gamma rays resulting from neutron interactions with nuclei of the irradiated formation and other well bore media following each neutron pulse and generating a corresponding time distribution of signals representative of the energies of the detected gamma rays;
selecting, in response to signals generated following the first of said neutron pulses, a portion of the time distribution of signals following the second of said neutron pulses which corresponds to gamma rays resulting predominantly from thermal neutron capture interactions with nuclei of the irradiated formation; and
analyzing at least a portion of the energy spectrum of the detected capture gamma rays corresponding to the signals within the selected portion of the time distribution of signals following said second neutron pulse.

41. The method of claim 40 wherein the signal-portion selecting step includes:
measuring a neutron characteristic of the irradiated formation in response to signals generated following the first neutron pulse; and
selecting said selected portion of the time distribution of signals following the second neutron pulse as a function of the measured neutron characteristic.

42. The method of claim 41 wherein the signal-portion selecting step further includes controlling the time of occurrence of the second neutron pulse as a function of the measured neutron characteristic.

43. The method of claim 42 wherein the time of occurrence of said selected signal portion is selected in relation to the time of occurrence of the second neutron pulse as a function of the measured neutron characteristic.

44. The method of claim 40 further comprising comparing the analyzed portion of the detected gamma ray spectrum with a composite energy spectrum, made up of weighted spectra of constituents postulated primarily to comprise the irradiated formation, to determine the proportions of the postulated constituents producing a composite spectrum which most nearly matches the analyzed portion of the detected gamma ray energy spectrum.

45. The method of claim 44 wherein the signal-portion selecting step includes:
measuring a thermal neutron capture characteristic of the irradiated formation in response to signals generated following the first neutron pulse; and
selecting said selected portion of the time distribution of signals following the second neutron pulse as a function of the measured thermal neutron capture characteristic.

46. The method of claim 45 further comprising recording representations of the measured thermal neutron capture characteristic and of the determined proportions of constituents as a function of the depth of the well tool in the well bore.

47. The method of claim 40 further comprising:
selecting a portion of the time distribution of signals following at least one of the said at least two neutron pulses which corresponds to gamma rays resulting predominantly from inelastic scattering neutron interactions with nuclei of the irradiated formation; and
analyzing at least a portion of the energy spectrum of the detected inelastic scattering gamma rays corresponding to the signals within the selected inelastic scattering gamma ray portion of the time distribution of signals following said at least one neutron pulse.

* * * * *

UNITED STATES PATENT OFFICE
CERTIFICATE OF CORRECTION

Patent No. 4,055,763　　　　　　　　　　Dated October 25, 1977

Inventor(s) Stephen Antkiw

It is certified that error appears in the above-identified patent and that said Letters Patent are hereby corrected as shown below:

Col. 1, line 20, "foundations" should read --formations--;
Col. 5, line 67, "phase" should read --pulse--;
Col. 9, line 4, "effects of" should read --effects on--;
Col. 10, line 2, "pedetermined" should read --predetermined--;
Col. 11, line 20, after "having" insert --a--;
Col. 13, line 45, "no" should read --not--;
Col. 13, line 49, "number of $\eta$" should read --number $\eta$--;
Col. 15, at the end of line 6, delete "$\lambda$".

Signed and Sealed this

Seventh Day of March 1978

[SEAL]

Attest:

RUTH C. MASON　　　　　　　　LUTRELLE F. PARKER
Attesting Officer　　　　Acting Commissioner of Patents and Trademarks